US005267391A

United States Patent [19]

Ingraham

[11] Patent Number: 5,267,391

[45] Date of Patent: Dec. 7, 1993

[54] TOOL FOR INSTALLING DEMOUNTABLE-WALL CLIPS ON WALL-BOARD PANELS

[76] Inventor: John D. Ingraham, 1306 Alpine Ave., Santa Clara, Calif. 95051

[21] Appl. No.: 1,819

[22] Filed: Jan. 8, 1993

[51] Int. Cl.[5] .......................... B23Q 7/10; B25C 5/00

[52] U.S. Cl. .................................. 29/566.1; 227/119; 227/120; 227/136

[58] Field of Search .................... 29/564.6, 566.1, 566, 29/809, 225, 243.56, 281.6; 227/95, 120, 130, 100, 118, 119, 135, 136

[56] References Cited

U.S. PATENT DOCUMENTS

| | | | |
|---|---|---|---|
| 2,500,721 | 3/1950 | Van Dijk | 227/120 |
| 2,765,465 | 10/1956 | Sorenson | 227/120 |
| 3,742,577 | 7/1973 | Buttriss | 29/243.56 |
| 3,833,064 | 5/1975 | Hilgers | 227/120 |
| 4,184,622 | 1/1980 | Spehrley, Jr. | 227/119 |
| 4,729,164 | 3/1988 | Steeves | 29/809 |
| 4,784,307 | 11/1988 | Ebihara | 227/120 |

FOREIGN PATENT DOCUMENTS

| | | | |
|---|---|---|---|
| 1478931 | 9/1969 | Fed. Rep. of Germany | 227/120 |
| 13638 | of 1913 | United-Kingdom | 29/566.1 |
| 1389955 | 4/1975 | United Kingdom | 29/566.1 |

*Primary Examiner*—William Briggs
*Attorney, Agent, or Firm*—Thomas E. Schatzel

[57] ABSTRACT

An embodiment of the present invention is a hand-held tool for use by a construction worker and comprises a top plate, a main drive assembly with a return spring, and a demountable-wall drop tube insert for receiving a belt of clips. The worker places the tool flat along one edge of a wall panel with one hand and mallets an exposed end of the main drive assembly with the other hand. The resulting forward motion of the main drive assembly snags a single clip from the drop tube insert, separates the clip from the belt, and drives a barbed end of the clip squarely into the wall panel.

14 Claims, 3 Drawing Sheets

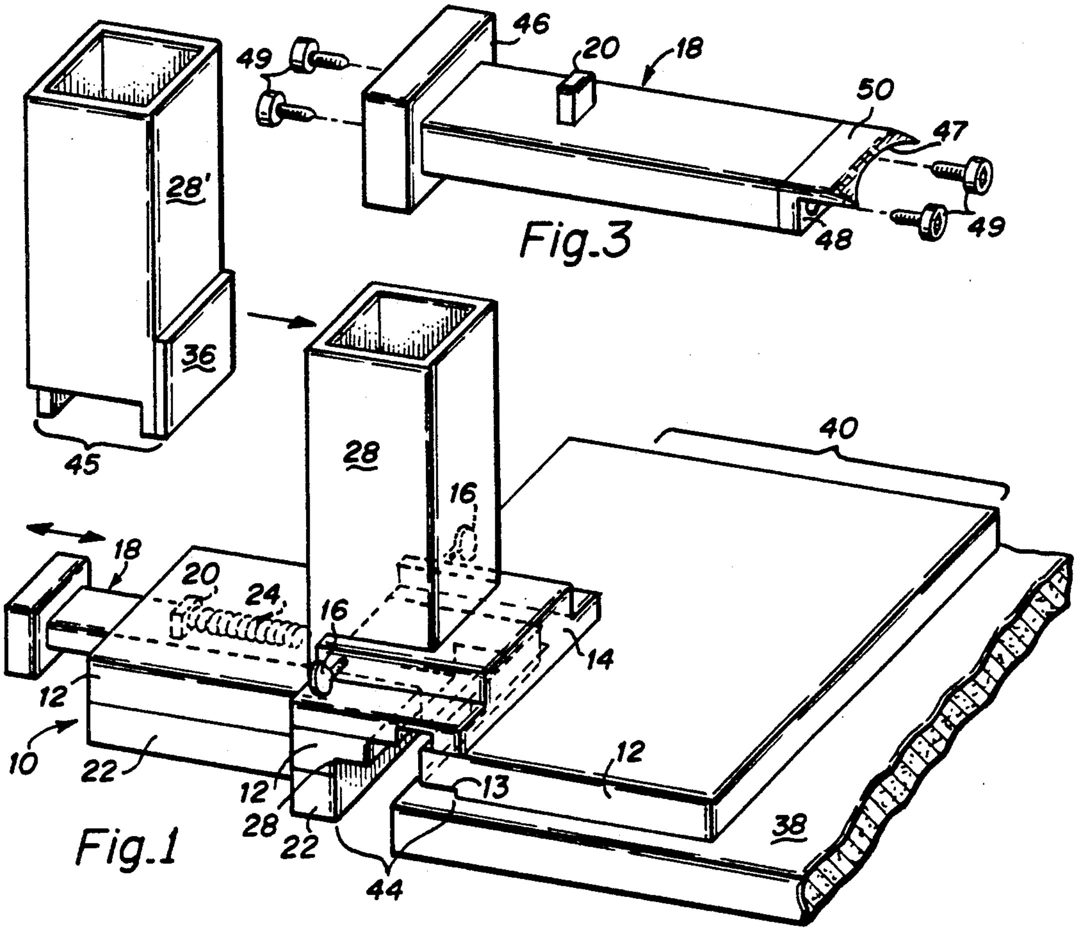
Fig.3
Fig.1
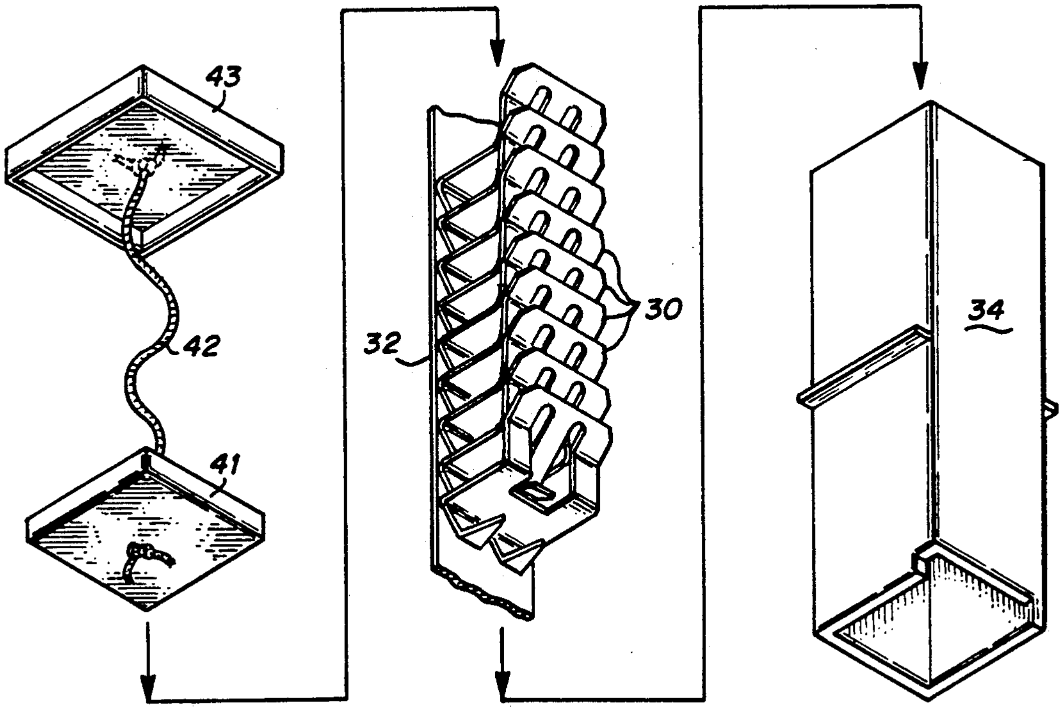
Fig.2

TOOL FOR INSTALLING DEMOUNTABLE-WALL CLIPS ON WALL-BOARD PANELS

BACKGROUND OF THE INVENTION

1. Field of the Invention

The present invention relates generally to home and office building construction and more specifically to tools that aid in installing demountable-wall clips on wallboard panels.

2. Description of the Prior Art

Until the middle of this century walls in home and office buildings were constructed of horizontal strips of lathe board that were nailed to vertical wood studs and then plastered. Such construction was expensive and labor intensive, as it required skilled workers to for proper performance. A less expensive method then replaced the earlier plaster-and-lathe board method. This included use of unitary panels, e.g., gypsum.

Gypsum panels are of various sizes, typically four by eight feet in length and covered by cardboard paper. A worker can cut the panels to size with a knife and then nail the cut panel directly to the wooden studs. The gaps between panels are bridged by a paper tape and a wall-board compound ("mud") is applied to smooth out the surface about the tape and dents caused by nailing. The wall may then be painted.

The plaster-and-lathe and gypsum panel construction methods both result in permanent wall structures. Some building constructions, especially interior office building areas, need temporary walls that can be moved, re-configured and adjusted without an excessive waste of the materials or labor.

Demountable-wallboards, which comprise flat sheets of gypsum encased in vinyl or fabric coverings, are each held in place by several edge clips to a gridwork of vertical H-studs that receive the clips. Each vertical edge of a panel has installed clips about eight inches apart that snap into a corresponding lip on an adjacent H-stud. The clips are typically supplied in bulk and a worker spills out a quantity of clips on a stack of panels to prepare for attachment. Clips are picked up and handled one at a time. A clip is picked up by a craftsman and positioned along a panel edge where, by use of a mallet, the craftsman drives the barbs on the clip into the panel.

Unfortunately, the mallet blows are not always square, and some deformity of the clip frequently results. Improperly installed clips can also weaken the gypsum in the panel and too loose a grip on the clip can degrade the strength of the installed panel. Deformed clips result in waste, both during the initial installation and later when the damaged clip cannot be re-used.

SUMMARY OF THE PRESENT INVENTION

It is therefore an object of the present invention to provide a tool for use in installation of demountable-wall clips on wall panels.

It is a further object of the present invention to provide a tool for use in proper and fast installation of demountable-wall clips or wall panels.

It is a further object of the present invention to provide a tool for use in installation of demountable-wall clips on wall panels and which tool can be used without any special training relating to such.

Briefly, an embodiment of the present invention is a hand-held tool for use by a construction worker and comprises a top plate, a drive assembly and a drop tube for receiving a belt of clips. The tool may be placed by the worker along one edge of a wall panel by one hand. An exposed end of a strike plate may then be struck with a mallet held in other hand. The resulting forward motion of the drive assembly snags a single clip from the drop tube insert, separates the clip from the belt, and drives a barbed end of the clip squarely into the wall panel.

An advantage of the present invention is that it provides a clip installation tool that reduces material waste of both wallboards and clips.

Another advantage of the present invention is that it provides a clip installation tool that allows a worker to install clip rapidly and efficiently.

Another advantage of the present invention is that it provides a tool for installation of demountable-wall clips on wall panels and which tool can be used without any special training relating to such.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a perspective view of a demountable-wall clip installation tool first embodiment of the present invention and a section of a wall panel;

FIG. 2 is an exploded assembly diagram, in perspective view, of a drop tube insert cap, string, insert plunger, clips, belt and drop tube insert that insert into the drop tube of the tool of FIG. 1;

FIG. 3 is a perspective diagram of the main drive assembly included in the tool of FIG. 1;

DETAILED DESCRIPTION OF THE PREFERRED EMBODIMENTS

Figure 4A:
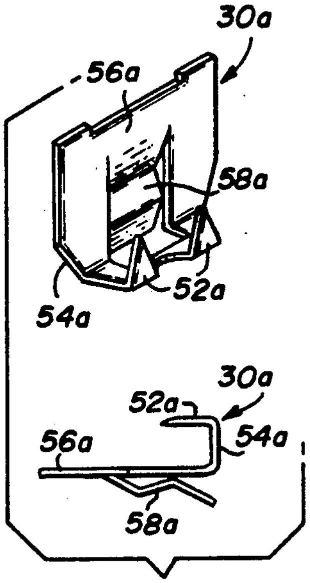
FIG. 4A is a perspective view and a side view of a first type of clip that may be used in the tool of FIG. 1.

FIGS. 1 and 2 illustrate a first embodiment of the present invention, a demountable-wall clip installation tool, referred to by general reference numeral 10. The tool 10 comprises a half-inch thick aluminum top plate 12 with a notch 13, a drop tube mount 14 with a pair of thumbscrews 16, an aluminum main drive assembly 18 with a drive assembly return stop 20, an aluminum bottom plate 22, a return spring 24, a chamber 26 (inside drop tube mount 14) and an aluminum drop tube 28 for receiving a plurality of clips 30 (FIG. 2) attached to a belt 32 and carried within a clip drop tube insert 34 that inserts within drop tube 28. Drop tube 28 is removable and is held in place by drop tube mount 14 and thumbscrews 16. Clips 30 are commercially available in a number of different sizes and configurations. Preferably, clips 30 are of a size and shape that permits them to be stacked and strung together by belt 32.

Drop tube insert 34 (FIG. 2) has an inside dimension selected to suit the particular clips 30 contained therein on belt 32. Drop tube 28 (FIG. 1) is typically comprised of one-eighth inch thick material and has an inside dimension able to accept a particular-sized drop tube insert 34. Drop tube 28 is preferably removable so that different-sized clips 30 and tubes 34 can be used in conjunction with an alternative drop tube 28'. For example, drop tube 28 will typically be approximately four inches long and have an inside dimension of one-and-an-eighth inches square, one-and-a-quarter inches square or one-and-a-half inches square. Drop tube mount 14 is sized to accommodate the largest drop tube 28, and a skirt 36 is attached to smaller drop tube 28' to fill the void between drop tube mount 14 and drop tube 28'. A plastic material is preferably used for drop tube insert 34. Clips 30 are conventional and may be obtained in bulk from commercial sources, such as United States Gypsum (USG).

FIG. 1 shows the junction of top plate 12 and bottom plate 22 form an inside corner 28 that is intended to be snugged up during use to an edge of a workpiece, such as a wall panel 38. Top plate 12 preferably has an area 40 of at least twenty-four square inches, e.g., six inches by four inches, and that extends beyond corner 28 and over the workpiece. Tool 10 has a center of gravity such that tool 10 will remain stable when area 40 is placed flat on a horizontal workpiece and corner 28 is adjacent to one edge of the workpiece. This then allows a craftsman to let go of tool 10 temporarily without it moving or falling off to the work area floor. In use, drop tube 28 is vertical and gravity forces clips 30 into chamber 26 (inside drop tube mount 14). An insert plunger 41 retained by a string 42 inside drop tube insert 34 and attached to a drop tube insert cap 43 helps feed the last few of clips 30 into chamber 26 after most of the other clips on belt 32 have been consumed. String 42 is of a length that will prevent insert plunger 41 from escaping drop tube insert 34 from the end opposite to drop tube insert cap 43.

Tool 10 is preferably substantially comprised of aluminum material, because aluminum reduces the weight of tool 10 and the effort required of a craftsman to move it into position. Drop tube insert 34 is preferably comprised of a plastic material. Spare tubes 34 each preloaded with clips 30 on respective belts 32 are associated with each tool 10 such that a craftsman can easily and quickly exchange a drop tube insert 34 that has been emptied during use for a fresh drop tube insert 34.

A relief 44 (FIG. 1) at one side of chamber 26 (inside drop tube mount 14) and notch 13 in top plate 12 allows tool 10 to pass clips 30 that have been installed in a workpiece out through one side of tool 10. A notch 45 in the bottom forward part of drop tube 28 (visible on tube 28' only in FIG. 1) also allows clearance for clips 30. Relief 44 allows tool 10 to be slid over to a next position on an edge of the workpiece after a clip has been installed by a mallet blow to main drive assembly 18.

FIG. 3 illustrates that main drive assembly 18 comprises a strike plate 46, a knife edge 47 and a clip drive head 48. Strike plate 46 and knife edge 47 are attached with recessed screws 49. Knife edge 47 is preferably comprised of #01 tool steel, such that a sharp edge for cutting belts 32 can be maintained. Best results will be obtained if knife edge 47 is symmetrical and slightly concave from end-to-end. Such a concave shape will allow belt 32 to be cut simultaneously from both sides towards the middle. This will result in clip 30 being cut free and driven forward by drive head 48 while remaining square, rather than to be twisted off-axis. The side of knife edge 47 adjacent to drive head 48 is normal to drive head 48 and planar. A rounded bow 50 radiuses knife edge 47 up to the level of the side of main drive assembly 18. The rounded bow 50 lifts clips 30 slightly back up into drop tube insert 34 when a clip is being cut free of belt 34. Knife edge 47 is positioned such that when a mallet blow by a user lands on strike plate 46, belt 32 will be cut just above the bottom clip 30 and the separated clip 30 will be driven into wall panel 38 by clip-driving drive head 48. Belt 32 is preferably a readily cut film material with an adhesive to retain clips 30 until severed by knife edge 47. Belt 32 may be similar to clear mending tape, such as SCOTCH brand 810 MAGICTAPE by 3M Corporation (St. Paul, Minn.).

Figure 4B:
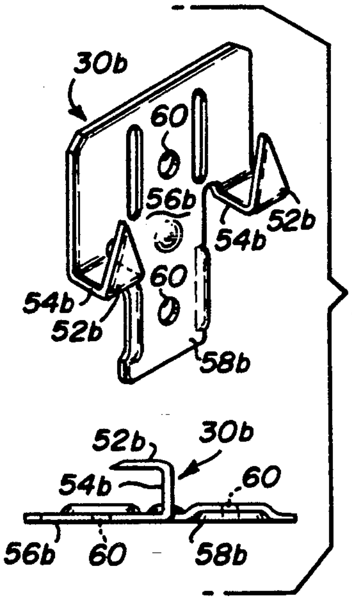
FIG. 4B is a perspective view and a side view of a second type of clip that may be used in the tool of FIG. 1.
Figure 4C:
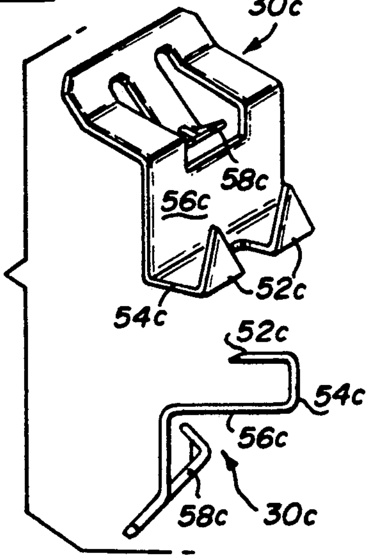
FIG. 4C is a perspective view and a side view of a third type of clip that may be used in the tool of FIG. 1.

FIGS. 4A through 4C illustrate three different types of commercially available clips 30, individually designated here as clips 30A, 30B and 30C. Each demountable-wall clip has a pair of barbs 52A, 52B and 52C, respectively. Barbs 52A-52C are adapted to be forced into the edge of a wall panel, e.g., wall panel 38. Wall panel 38 typically comprises a flat gypsum panel with a vinyl or fabric covering. The barbs 52A-52C project normal from a side wall 54A-54C which abuts with the edge of a wall panel when installed. A side wall 56A-56C of clips 30A-30C projects normal from a wall such that its surface is parallel to the surfaces of the barbs 52A-52C. Side wall 56A-56C abuts one side wall surface of wall panel 38 when installed. A tang 58A-58C permits attachment of clip 30A-30C to a wall system after clips 30A-30C are installed on wall panel 38, for example. Relief 44 (FIG. 1) is such that clearance is provided for the variety in tangs 58A-5C. Tang 58A allows wall panel 38 to be attached to the edge of a metal strip parallel to wall panel 38, such as to an H-stud. Tang 58B allows wall panel 38 to be nailed or screwed to a stud through one or both of a pair of holes 60. Tang 58C allows wall panel 38 to be attached to a wall system that has a channel or socket to receive tang 58C at right angles to the side wall surface of wall panel 38. Tangs 58A and 58C have a spring action that holds the assembled wall systems in place and yet allow removal of individual wall panels 38 and respective clips 30.

Figure 5A:
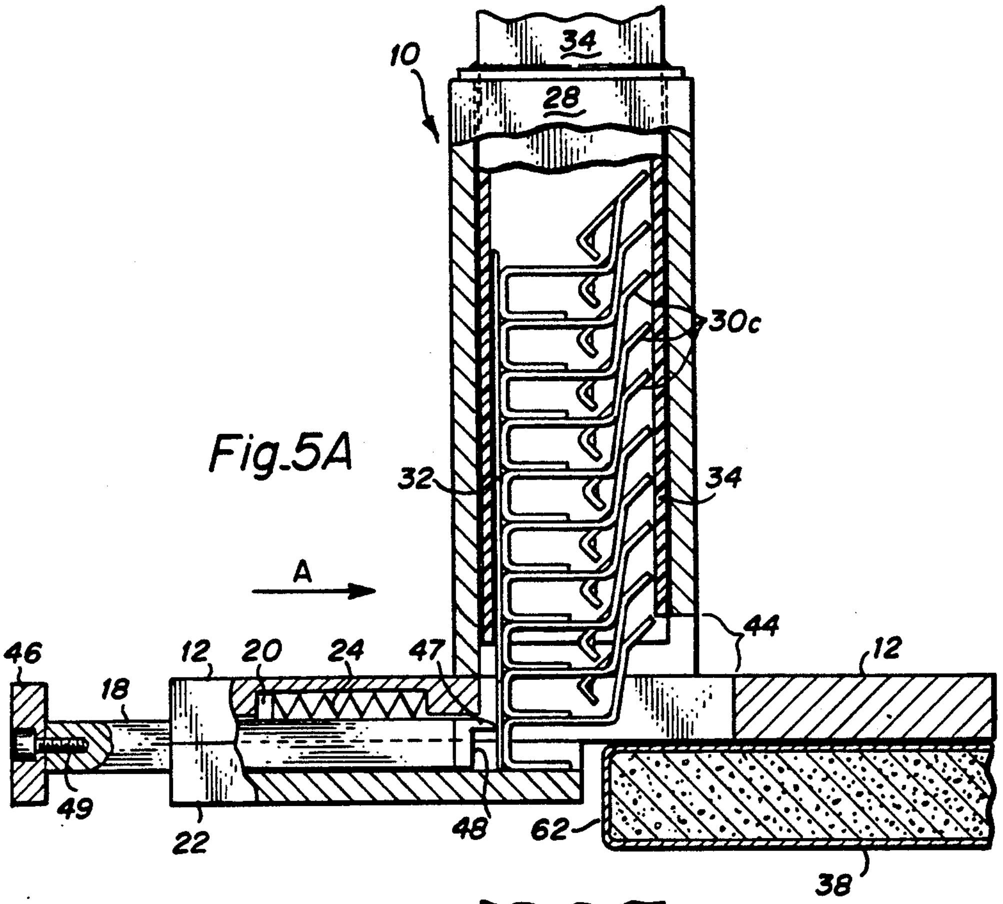
FIG. 5A is a cross-sectional side view of the tool of FIG. 1 with the main drive assembly of FIG. 3 in its relaxed, extended position.
Figure 5B:
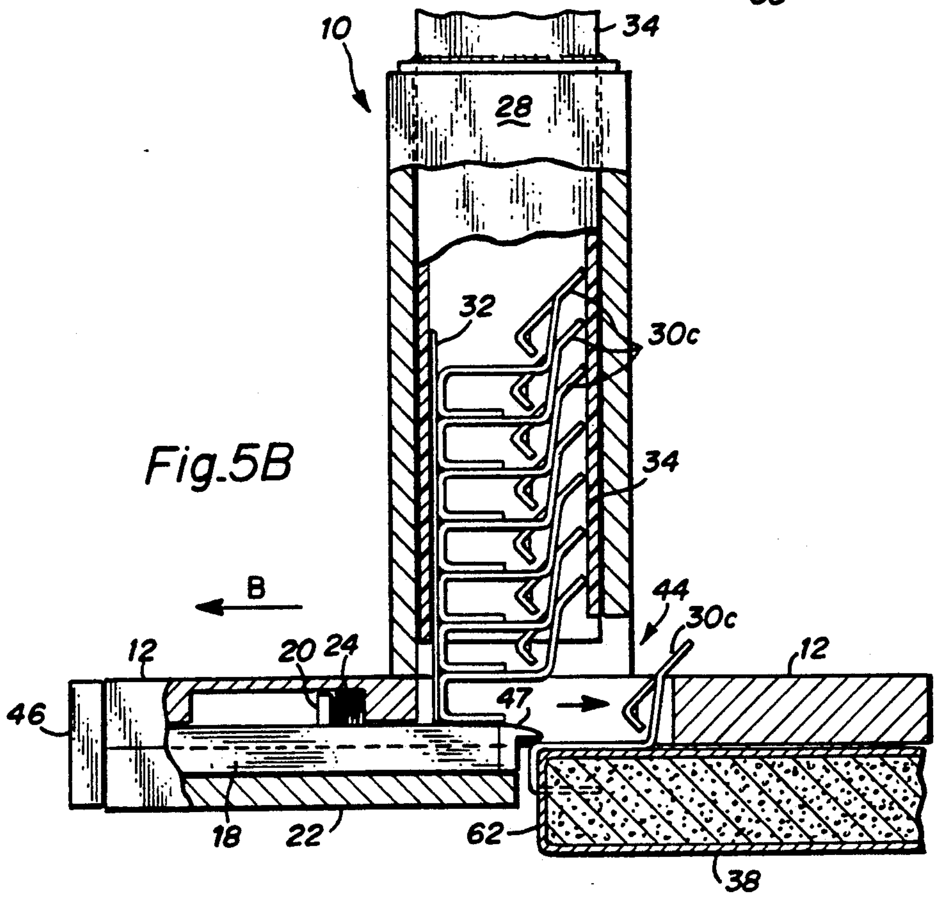
FIG. 5B is a cross-sectional side view of the tool of FIG. 1 with the main drive assembly of FIG. 3 in its compressed, inward position.

FIGS. 5A and 5B illustrate tool 10 before and after a mallet blow by a craftsman to strike plate 46. In FIG. 5A, a blow to strike plate 46 will drive main drive assembly 18, knife edge 47, drive head 48 and thus clip 30 in a direction "A" such that barbs 52A-52C pierce an edge 62 in wall panel 38. In FIG. 5B, return spring 24 operates to return main drive assembly 18 in a direction "B" to its original at-rest position. Drive assembly return stop 20 acts to contain main drive assembly 18 between the positions shown in FIGS. 5A and 5B. Gravity then feeds a next clip 30 into chamber 26 (inside drop tube mount 14).

In operation, a craftsman loads tool 10 by inserting a fresh belt of clips 30 carried in drop tube insert 34 into the top of drop tube 28. Top plate 12 is laid flat against wall panel 38 with inside corner 28 placed flush up to edge 62 (FIGS. 5A and 5B). The craftsman strikes strike plate 46 with a mallet, thus driving main drive assembly 18 toward drop tube insert 34 and wall panel 38. Knife edge 47 cuts belt 32 and the bottom-most clip 30 is released and driven squarely into wall panel 38 flush up to edge 62. Tool 10 is then slid longitudinally along edge 62 such that the clip 30 embedded in wall panel 38 passes out through relief 44.

Main drive assembly 18 could be driven by electric solenoid or pneumatic piston at the touch of an activating trigger, but the manual manipulation by mallet blow is preferred due to its simplicity and freedom from cord entanglement problems.

Figure 6:
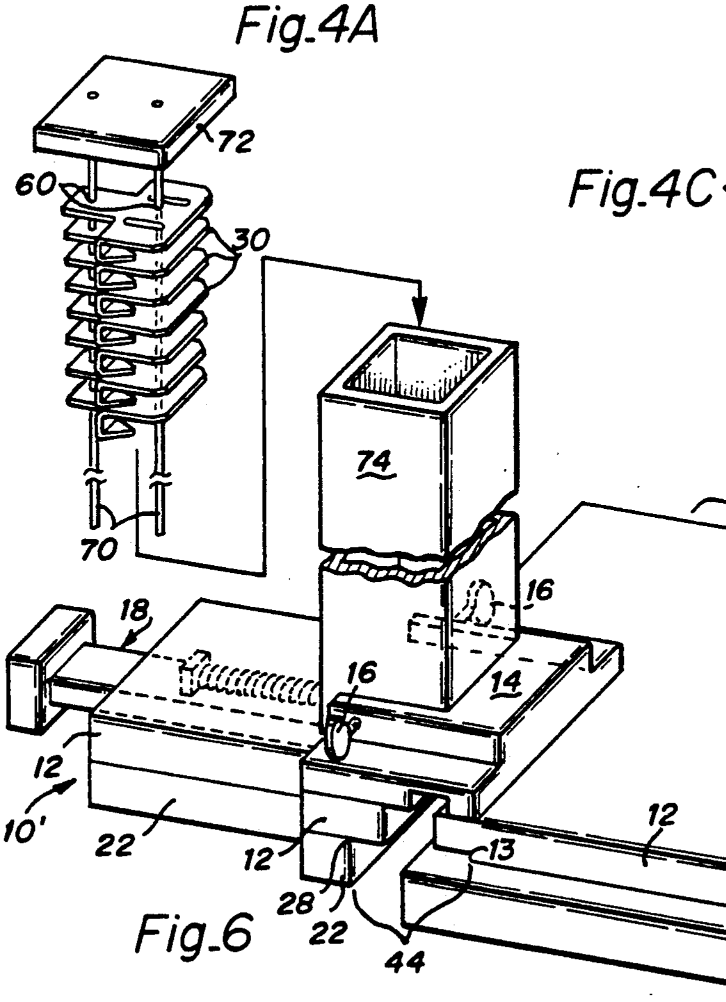
FIG. 6 is a perspective view of a demountable-wall clip installation tool second embodiment of the present invention and a section of a wall panel.
Figure 6:
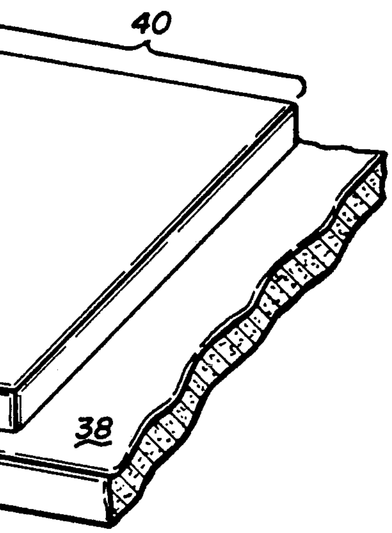

FIG. 6 illustrates a second embodiment of the present invention, which is a tool similar to tool 10, and is therefore referred to herein with prime notation as general reference number 10'. Tool 10' differs from tool 10 in that an alternative method of stacking clips is provided. Clips 30B (FIG. 4B) have the pair of holes 60 that permit a pair of rods 70 that are connected to a cap 72 to organize clips 30B within a drop tube 74. Drop tube 74 is similar to drop tube 28, but is approximately ten inches long and does not receive a drop tube insert of clips similar to drop tube insert 34 (FIG. 2). Cap 72 may be attached to the top of drop tube insert 74 by press-fitting, spring clips, etc.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A tool for demountable-wall clip attachment to a panel having an edge and a face surface, the tool comprising:

a drop tube for receiving a belt of demountable-wall clips and for supplying said clips one at a time to a chamber;

a main drive assembly including a knife edge at one end and a strike plate at the other end for cutting a clip from said belt, guiding and driving a clip separated from said belt in said chamber into an edge of a wall panel; and a top plate including means for channeling the main drive assembly and for holding the drop tube orthogonal to said channeling means and including squaring means juxtaposable with said panel face surface and edge for aligning the main drive assembly and said separated clip normal to said wall panel edge.

2. The tool of claim 1, further comprising:

a plurality of demountable-wall clips;

a belt for attaching the demountable-wall clips to one another in a stack; and a drop tube insert for carrying the demountable-wall clips attached to the belt and for loading into the drop tube wherein the clips are automatically sequenced into said chamber one at a time for driving into said wall panel edge by the main drive assembly.

3. The tool of claim 2, wherein:

the plurality of demountable-wall clips comprises clips that each have barb means for embedding and anchoring the clip into said wall panel and spring latch means for engagement with an H-stud.

4. The tool of claim 1, further comprising:

a relief in the top plate and said chamber for permitting the tool to be slid over to a next position on said wall panel edge and that allows the tool to clear itself from a clip that was previously installed by the tool on said wall panel edge at a prior position.

5. The tool of claim 1, wherein:

the drop tube, the main drive assembly and the top plate each are substantially comprised of aluminum.

6. The tool of claim 1, further comprising:

return spring means for allowing the main drive assembly to move from a first position to a second position as a consequence of a blow to said strike plate and for subsequently returning the main drive assembly from said second position to said first position such that said chamber may receive one of said demountable-wall-clips.

7. A tool for attaching demountable-wall clips to a wall panel, the tool comprising:

a first plurality of demountable-wall clips stacked together and held together by a belt;

a first drop tube insert for receiving the plurality of demountable-wall clips;

a drop tube for receiving the drop tube insert and for supplying said clips one-at-a-time into a chamber;

a main drive assembly for cutting a clip from said belt, guiding and driving a single clip separated from said belt in said chamber squarely into an edge of said wall panel; and a top plate including means for channeling the main drive assembly and for holding the drop tube orthogonal to said channeling means and including squaring means for aligning the main drive assembly and said separate clip normal to said wall panel edge and including a relief to permit said clips to pass through once embedded in said wall panel edge.

8. The tool of claim 7, wherein:

said demountable wall clips each include two barbed ends for anchoring within a gypsum panel.

9. The tool of claim 7, wherein:

the drop tube insert comprises a drop tube insert cap, a string attached to said drop tube insert cap and an insert plunger attached to said string for guiding said clips through the drop tube insert with the aid of gravity.

10. The tool of claim 7, wherein:

the drop tube is removable to permit a substitute drop tube to be attached to the tool and that is sized for a second plurality of clips and a second drop tube insert substantially different in size to the first plurality of clips and first drop tube insert.

11. The tool of claim 7, wherein:

the main drive assembly includes a knife edge for cutting said belt.

12. The tool of claim 11, wherein:

said knife edge is symmetrical and slightly concave end-to-end for maintaining the square of said clip within the tool during said cutting.

13. The tool of claim 7, wherein:

the top plate includes a planar area for resting the tool flat against said wall panel along one edge during tool use and that has a center of gravity that permits the tool to be stable in place unassisted on the wall panel when the wall panel is horizontal.

14. A tool for demountable-wall clip attachment to a panel, the tool comprising:

an aluminum drop tube for receiving a belt of demountable-wall clips and for supplying said clips one at a time to a chamber;

an aluminum main drive assembly including a knife edge at a first end and a strike plate at an opposite end for cutting a clip from said belt, guiding and driving a clip separated from said belt in said chamber into an edge of a wall panel;

an aluminum top plate including means for channeling the main drive assembly and for holding the drop tube orthogonal to said channeling means and including squaring means for aligning the main drive assembly and said separated clip normal to said wall panel edge;

a plurality of demountable-wall clips wherein each clip includes barb means for embedding and anchoring the clip into said wall panel and spring latch means for engagement with an H-stud;

a belt for attaching the demountable-wall clips to one another in a stack;

a drop tube insert for carrying the demountable-wall clips attached to the belt and for loading into the drop tube wherein the clips are automatically sequenced into said chamber one at a time for driving into said wall panel edge by the main drive assembly;

a relief in the top plate and said chamber for permitting the tool to be slid over to a next position on said wall panel edge and that allows the tool to clear itself from a clip that was previously installed by the tool on said wall panel edge at a prior position; and return spring means for allowing the main drive assembly to move from a first position to a second position as a consequence of a blow to said strike plate and for subsequently returning the main drive assembly from said second position to said first position such that said chamber may receive one of said demountable-wall-clips.

* * * * *